Aug. 23, 1960
A. J. HATCH
2,950,382
PROJECTION LAMP
Filed Dec. 17, 1956
7 Sheets-Sheet 2
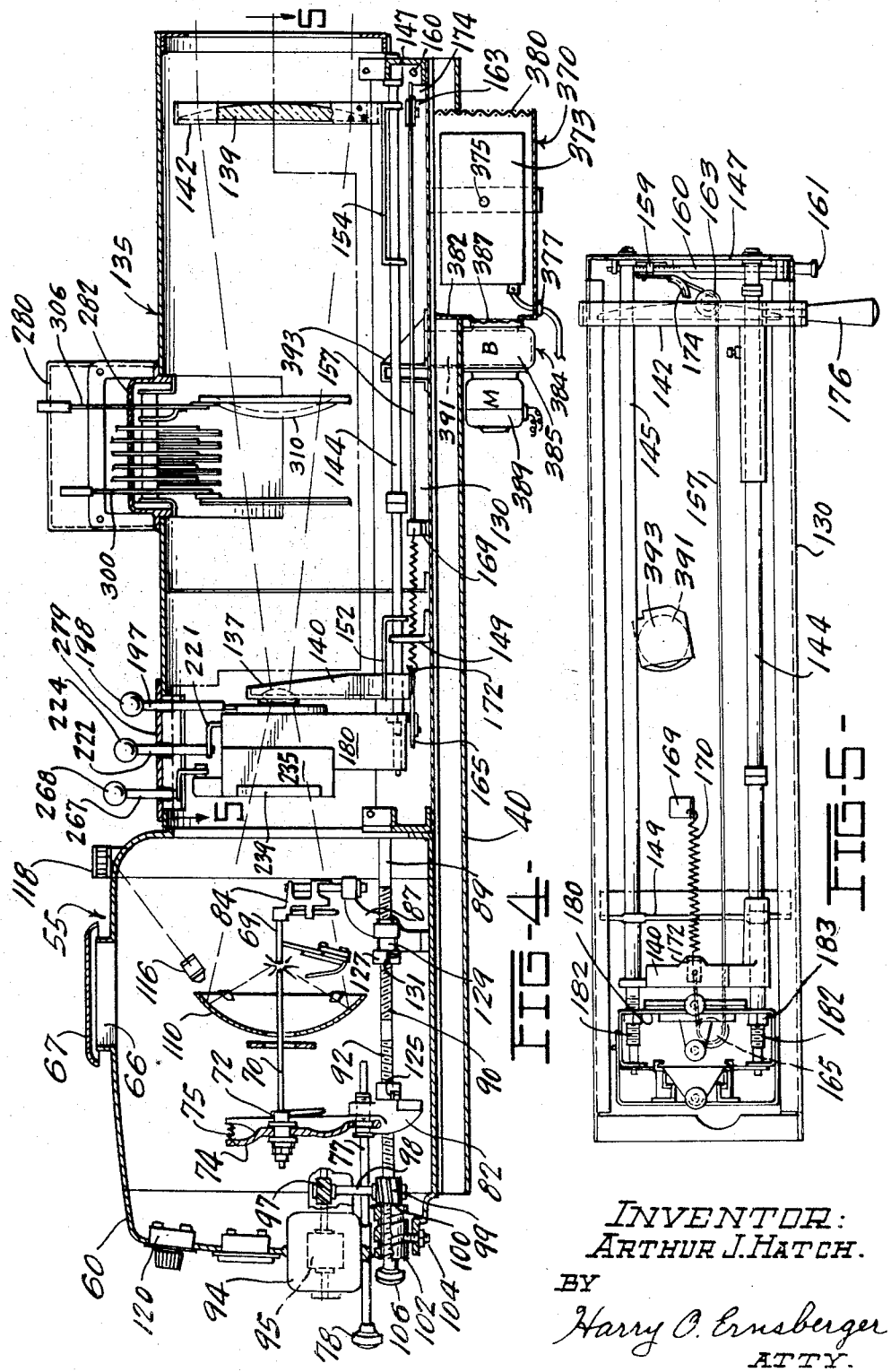
INVENTOR:
ARTHUR J. HATCH.
BY
Harry O. Ernsberger
ATTY.

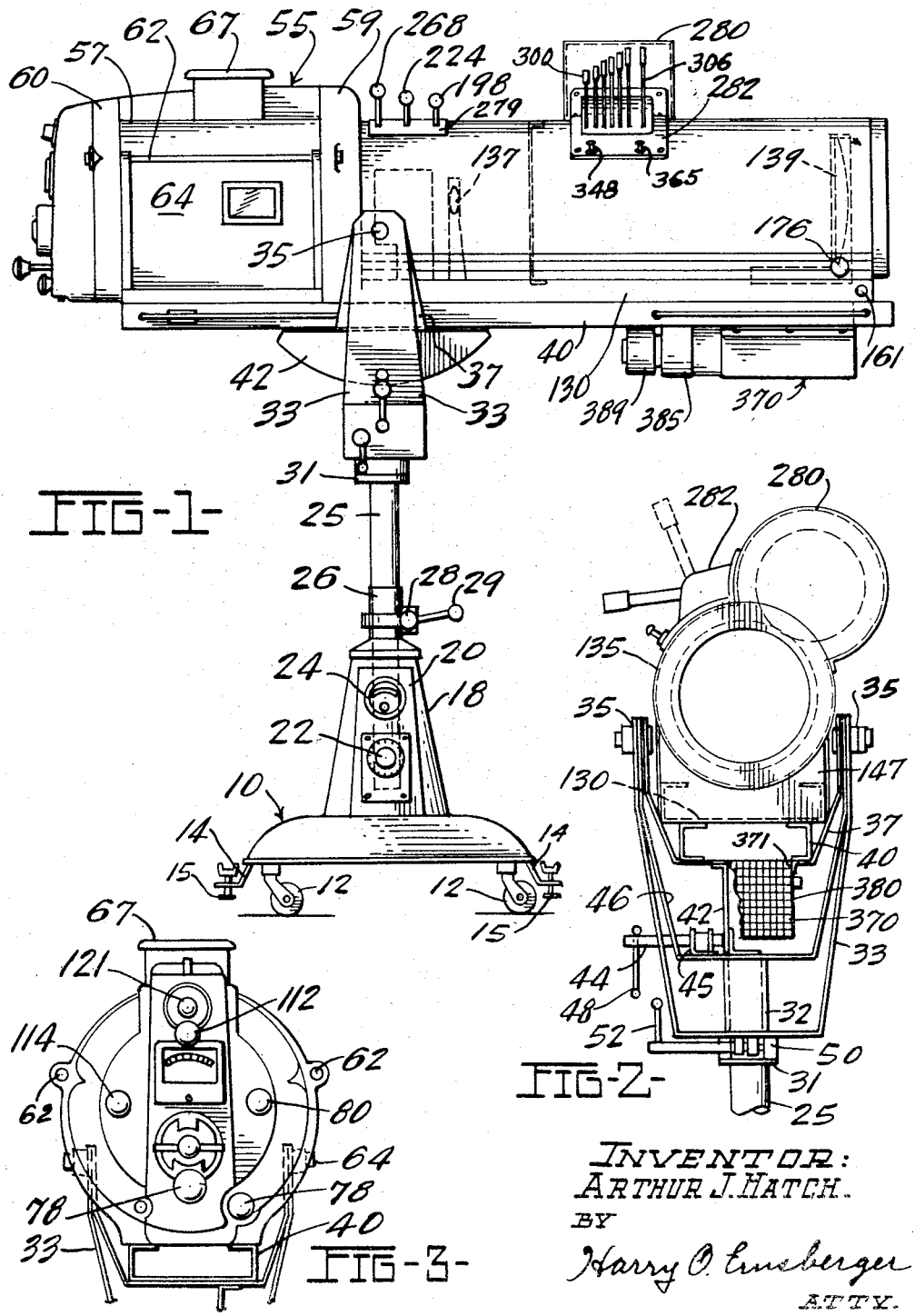

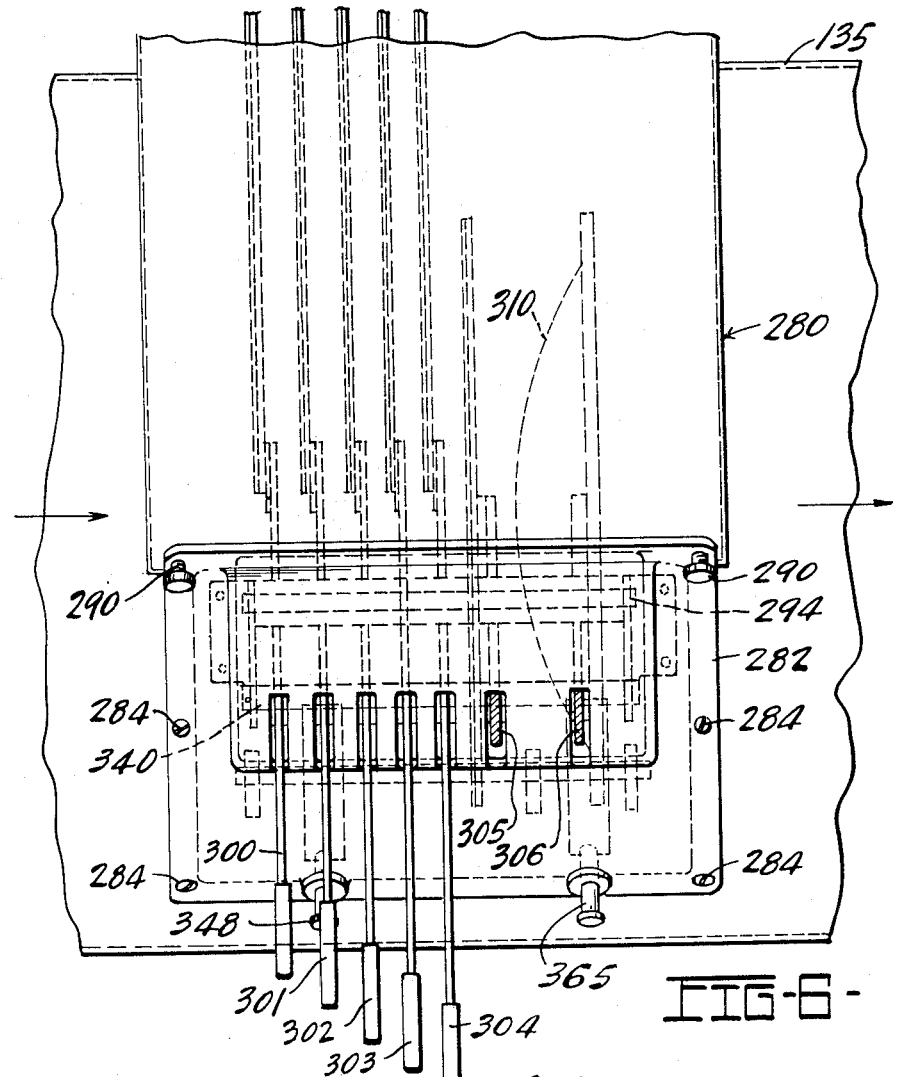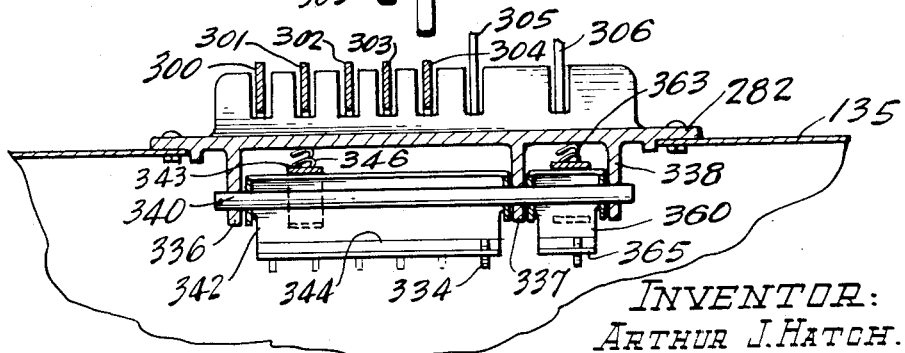

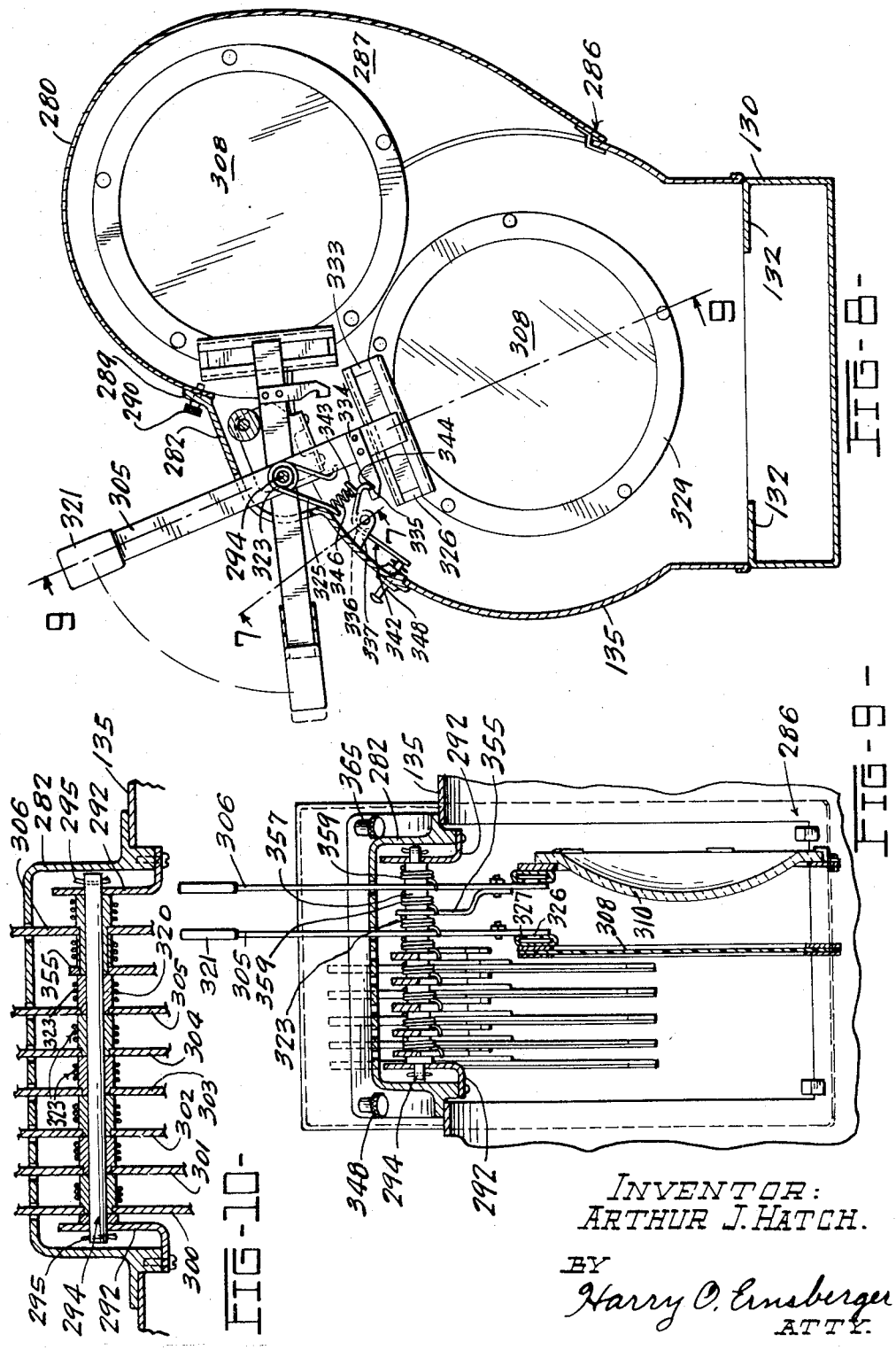

Aug. 23, 1960     A. J. HATCH     2,950,382
PROJECTION LAMP
Filed Dec. 17, 1956     7 Sheets-Sheet 5
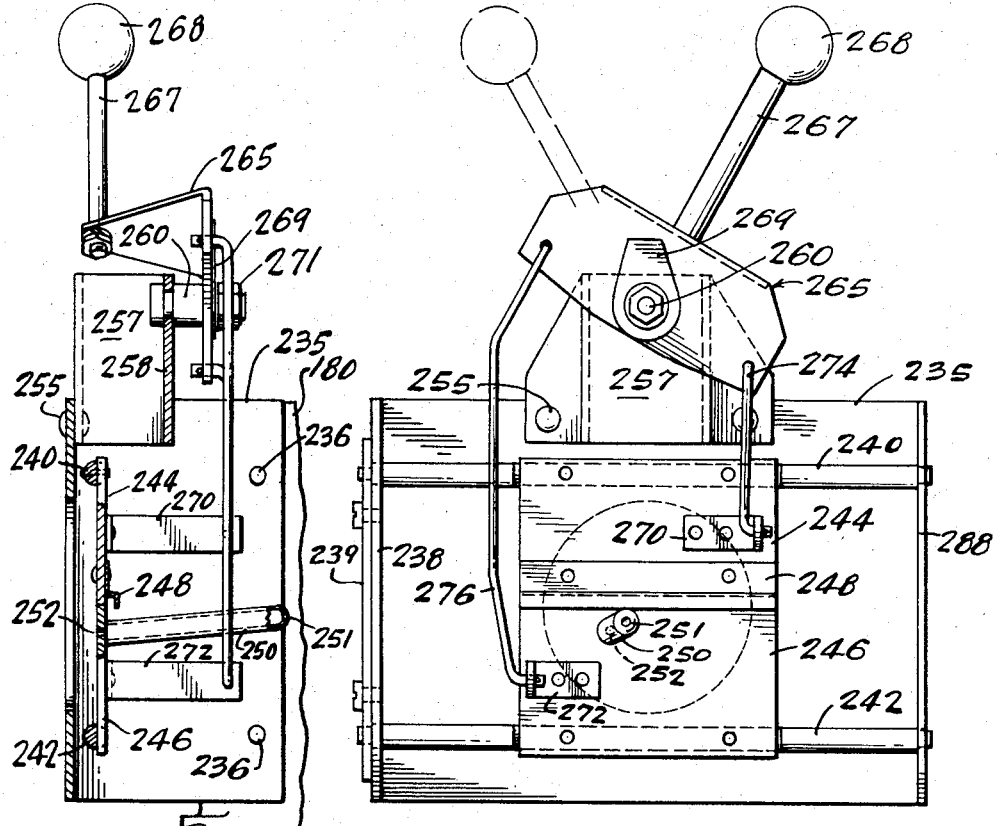
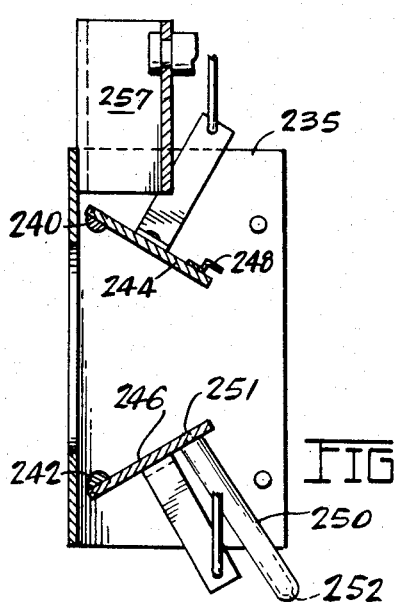
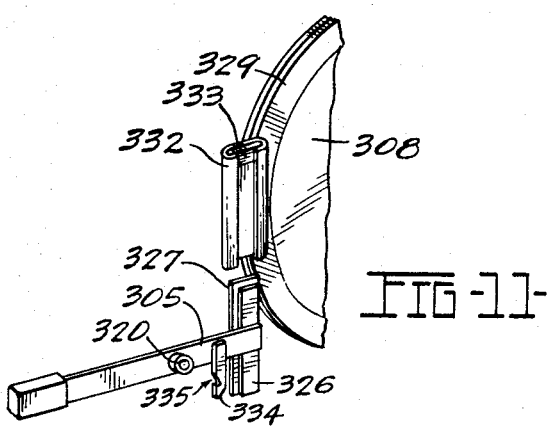
INVENTOR:
ARTHUR J. HATCH.
BY
Harry B. Ernsberger
ATTY.

Aug. 23, 1960 A. J. HATCH 2,950,382
PROJECTION LAMP
Filed Dec. 17, 1956 7 Sheets-Sheet 6
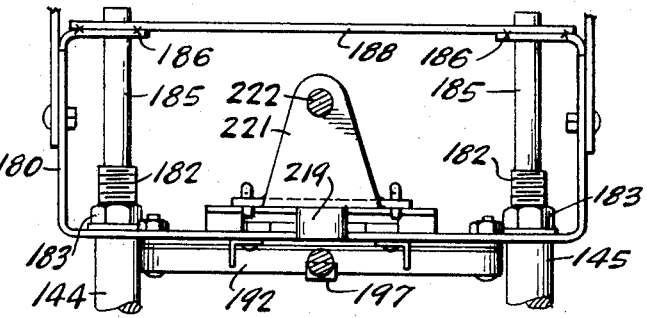
FIG-17-
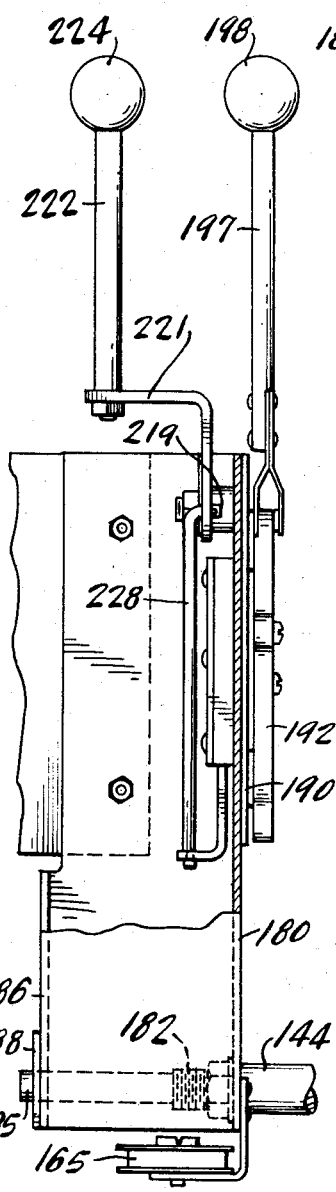
FIG-16-
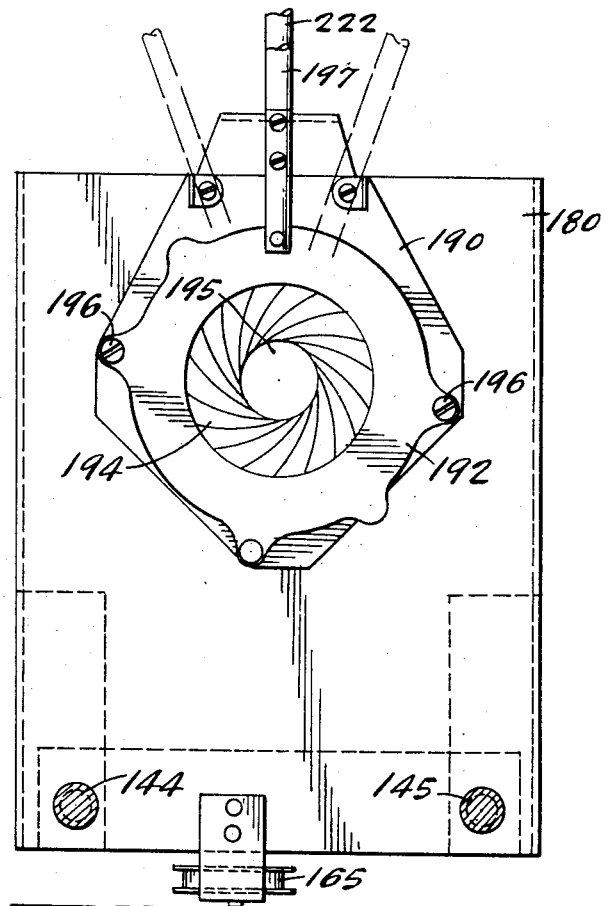
FIG-15-
INVENTOR:
ARTHUR J. HATCH.
BY
Harry O. Ernsberger
ATTY.

Aug. 23, 1960
A. J. HATCH
2,950,382
PROJECTION LAMP
Filed Dec. 17, 1956
7 Sheets-Sheet 7
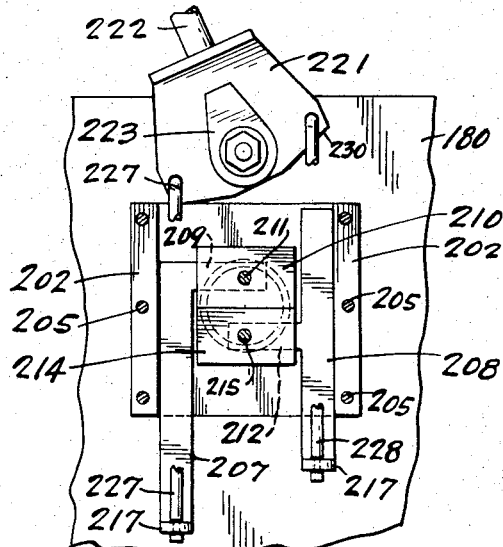
FIG-20-
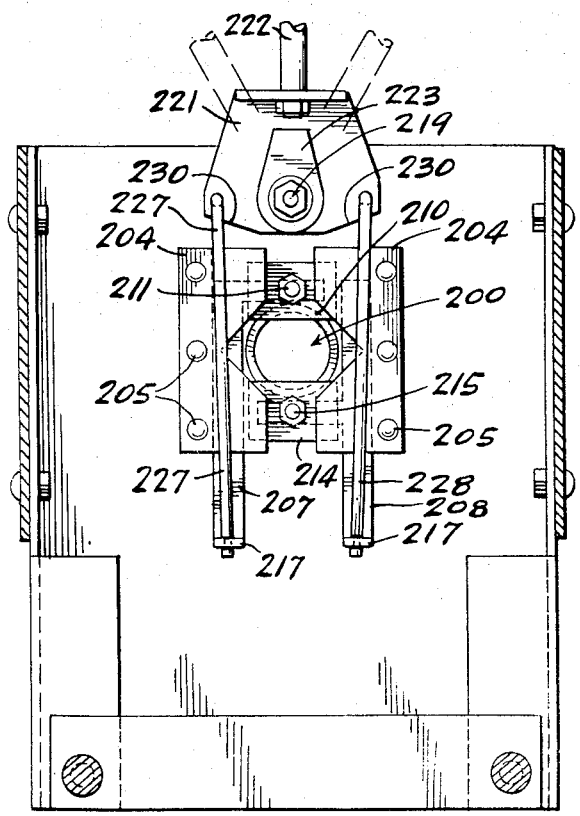
FIG-18-
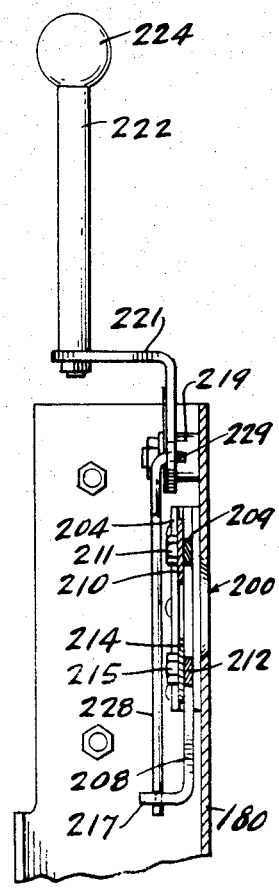
FIG-19-
INVENTOR:
ARTHUR J. HATCH.
BY
Harry O. Ernsberger
ATTY.

United States Patent Office 2,950,382
Patented Aug. 23, 1960

2,950,382

PROJECTION LAMP

Arthur J. Hatch, Toledo, Ohio, assignor to The Strong Electric Corporation, Toledo, Ohio, a corporation of Delaware Filed Dec. 17, 1956, Ser. No. 628,722

2 Claims. (Cl. 240—3.1)

This invention relates to projection lamps, and more especially to a high intensity lamp particularly suitable for spot or flood illumination for theater, cinema photography and television uses and purposes.

The present invention embraces the provision of a projection lamp embodying an optical system inclusive of a light source associated with a reflector and successive lenses adjustable to produce a beam of proper focus and embodying a multi-color boomerang or color filter arrangement.

An object of the invention embraces the provision of a high intensity reflector type projection lamp embodying a multi-color filter or boomerang arrangement wherein the color filters or screens are disposed for individual operative use between the lenses of the lens system and wherein the color filters, when not in use are enclosed within a suitable housing or enclosure preventing likelihood of damage thereto.

Another object of the invention is the provision of a projection lamp of a high intensity reflector type utilizing an electric arc as a preferred light source in conjunction with an adjustable focus lens system and embodying individual color filters selectively movable into the path of the light beam wherein a color filter in operative position is automatically released and moved to an inoperative position upon the movement of a different color filter into operative position.

Another object of the invention is the provision of a projection lamp particularly adapted for spot and flood light uses embodying a simple, yet effective, iris control or aperture forming means for the light beam, a movable blade type of masking shutter adapted for forming a rectangular configuration or strip of light and a combined dimming control and light beam interrupter or dowser wherein the controls for these components are in juxtaposition and convenient for use of the operator.

Another object of the invention is the provision of a projection lamp of the high intensity reflector type embodying an electric arc as a light source which is energized by direct current obtained through a rectifier and wherein the rectifier is associated with or carried by the lamp assembly and is equipped with means for establishing continuous air flow through the rectifier for cooling the same.

Another object of the invention resides in a color boomerang or color filter arrangement or system wherein the color filters are individual and are supported in a manner whereby they may be readily removed and new filters inserted without the use of tools.

Still another object of the invention resides in a color boomerang for projection lamps in which each individual color filter may be moved to operative position and whereby such movement releases any filter or filters from operative position and are automatically moved to inoperative position.

Still a further object is the provision of a color boomerang or color filter system wherein a filter or filters in operative position in the path of a light beam may be returned to inoperative position without movement of another filter into operative position.

A further object of the invention is the provision of a projection lamp in which the various control devices are arranged and disposed for convenience of manipulation by the operator.

Further objects and advantages are within the scope of this invention such as relate to the arrangement, operation and function of the related elements, and to combinations of parts, elements per se, and to economies of manufacture and numerous other features as will be apparent from a consideration of the specification and drawing of a form of the invention, which may be preferred, in which:

Figure 1 is an elevational view of a projection lamp of the invention;

Figure 2 is a front elevational view of the upper portion of the arrangement shown in Figure 1;

Figure 3 is a rear elevational view of the lamp housing and controls for electrical components of the lamp;

Figure 4 is a longitudinal vertical view through the lamp construction illustrated in Figure 1;

Figure 5 is a longitudinal sectional view taken substantially on the line 5—5 of Figure 4;

Figure 6 is a plan view of a housing arrangement enclosing the color boomerang assembly and showing the controls for the color filters;

Figure 7 is a detail sectional view taken substantially on the line 7—7 of Figure 8;

Figure 8 is a transverse sectional view through the color boomerang arrangement;

Figure 9 is a sectional view taken substantially on the line 9—9 of Figure 8;

Figure 10 is a detail sectional view through the supporting means for the color filter assemblies of the color boomerang arrangement;

Figure 11 is a fragmentary isometric view illustrating the method of assembling a color filter unit with a supporting and manipulating means therefor;

Figure 12 is an elevational view of a light dimming and dowser arrangement of the lamp;

Figure 13 is a vertical sectional view of the arrangement shown in Figure 12 showing the light dimming components in light beam interrupting or blocking position;

Figure 14 is a view similar to a portion of Figure 13 showing the light dimming components in open position;

Figure 15 is an elevational view illustrating an aperture or iris control for the light beam;

Figure 16 is a vertical sectional view through the supporting means for the iris or aperture control;

Figure 17 is a plan view of the arrangement shown in Figure 15;

Figure 18 is a transverse sectional view showing a light masking means or shutter arrangement;

Figure 19 is a vertical sectional view through the arrangement shown in Figure 18, and Figure 20 is an elevational view showing the light masking elements in another position of adjustment.

While the preferred arrangement of projection lamp of the invention is illustrated as embodying a light source comprising an electric arc supplied with direct current from a rectifier, it is to be understood that the lens arrangement and the color boomerang construction may be utilized in lamp constructions utilizing other light sources as, for example, an incandescent or filament light source.

Referring to the drawings in detail, and initially to Figures 1 through 3, the lamp construction is mounted upon a supporting means or standard which is inclusive of a hollow base member 10 equipped with casters 12 for ease in moving the lamp. The base member is equipped with brackets 14 carrying adjustable pads or feet 15. When it is desired to maintain the lamp in a fixed position, the pads or feet 14 may be threaded downwardly through threaded openings in brackets 14 so that the feet project below the horizontal plane of the contacting regions of the casters 12 with the floor or other support to elevate the casters from the support.

Mounted upon the base plate 10 is a cone-shaped member supporting a housing 20 enclosing a transformer (not shown) for reducing the voltage of the current supply delivered to a rectifier which provides a direct current supply for the carbons or electrodes of the arc or light source. A multi-contact or rotary tap switch operated by a control knob 22 is supported within the switch housing 20.

The multi-contact or rotary tap switch may be adjusted to compensate for variations in the line voltage of the alternating current supply and a meter 24 is provided with a marked zone as a guide in selecting the correct setting of the tap switch. The lamp supporting means or standard includes a tube or post 25 which is telescoped within a sleeve 26 carried at the upper end of the member 18.

The tube 25 extends through the sleeve 26 and through the member 18 and is adjustable vertically to vary or change the height of the lamp. The tube 26 is held in adjusted position by a clamping means 28 which is of C-shape and which may be drawn up into clamping position by manipulation of a handle 29. The handle 29 may be of a removable type so that it may be disengaged and put in stored position after the clamp means 28 is drawn into clamping position to prevent inadvertent release of the clamping means.

Secured to the post 25 is a collar 31 which supports a substantially U-shaped member 33. The upwardly extending leg portions of the member 33 are equipped with trunnions 35 which form pivotal supports for a lamp supporting cradle or U-shaped element 37.

The lamp structure is supported upon a generally channel shaped frame of base member 40 extending substantially full length of the lamp structure. The lamp supporting base member or channel 40 is mounted in the bight portion of the cradle 37 as shown in Figures 2 and 3. Secured to the bight portion of the cradle 37 is a segment shaped member 42 which depends from the base member 40.

A locking rod 44 associated with a bracket 45 carried by a second U-shaped member 46 disposed within the member 33 is adapted by manipulation of a handle member 48 to lock the segment 42 in a fixed position of adjustment. It should be noted that the lamp assembly is tiltable about the axis of the trunnions 35 and may be locked in any position of tilt through manipulation of the locking rod 44.

The supporting members 33 and 46 and the lamp assembly and other components carried thereby are arranged for horizontal rotary movement about the axis of the tube 25. The upper end of the tube 25 extends through a sleeve 32 welded to the bight portions of members 33 and 46, the sleeve forming a bearing means for the tube 25.

A clamp member 50 secured to member 33 is disposed above the collar 31 and surrounds the tube 25, and is arranged to be drawn into clamping or locking position by manipulation of a handle 52 to secure or lock the lamp assembly in a position of horizontal swing to which the lamp may be moved or adjusted. The horizontal pivotal support for the lamp assembly provided by the trunnions 35 is disposed in a position whereby the lamp assembly is substantially balanced about the axis of the trunnions to facilitate ease in tilting the lamp.

The rear portion of the frame of base member 40, that is, the portion at the left of the lamp supporting cradle 37 as viewed in Figure 1, carries the lamp housing or casing 55. The lamp housing structure is inclusive of a central body portion 57 and members 59 and 60 at the respective end regions of the body portion 57. The members 59 and 60 are held in proper relation by means of longitudinally extending rods 62 shown in Figures 1 and 3.

An access door or panel 64 is provided at each side of the lamp housing, each panel being hingedly supported upon a rod 62 as shown in Figure 1 and adapted for pivotal movement about the rod to an open position for purposes of inspection or electrode replacement. The upper portion of the lamp housing is formed with a vent opening 66 equipped with a cap 67 spaced from the housing portion to provide suitable ventilating means for the lamp housing.

With particular reference to Figure 4 in the embodiment illustrated, the light source is an electric arc produced by current flow through spaced electrodes or carbons, the positive carbon or electrode being designated 69 and the negative carbon or electrode 70. The negative carbon 70 is supported by means of a suitable holder 72 associated with a member 74 which is biased in a forward direction by means of a contractile spring 75.

The member 74 is connected with a rod 77 which may be manipulated by means of a control knob 78 for adjusting the vertical position of the negative carbon 70. A horizontal adjusting means (not shown) is provided for the negative carbon which may be adjusted in a conventional manner by manipulation of a control knob 80 shown in Figure 3. The holder 72 for the negative electrode or carbon 70 is supported upon a movable carriage 82.

The positive electrode or carbon 69 is supported by a suitable holder 84 mounted upon a carriage 87 as shown in Figure 4. Extending longitudinally of the lamp housing is a threaded shaft or rod 89 which is journalled in suitable bearings (not shown) and is adapted, upon rotation, to move the carriages 82 and 87 toward each other at different rates of speed to compensate for the difference in burning rates of the carbons so as to maintain the arc at a substantially constant relative position.

To accomplish this result, the shaft 89 is provided with a right-hand threaded zone 90 for cooperation with the carriage 87, and with a left-hand threaded zone 92 for cooperation with the negative carbon supporting carriage 82. The right-hand threads 90 are of greater pitch than the left-hand threads 92 so that the carriage 87, supporting the positive electrode 69, is moved at a greater rate than that of the negative electrode 70 supported by the carriage 82, as the positive carbon burns away at a greater rate than the negative carbon.

The driving means for the carriage-actuating shaft 89 is inclusive of a motor 94, the armature 95 of which drives a worm which is in mesh with a worm wheel 97 carried upon a vertical shaft 98. The shaft 98 is provided at its lower end with a worm 99 which is in mesh with a worm wheel 100 having operative driving connection with the shaft 89 through suitable clutch means or other interconnection (not shown) contained within the interior of the worm wheel 100.

The shaft 89 may be manually moved lengthwise to adjust the relative position of the arc formed between the extremities of the electrodes 69 and 70. As shown in Figure 4, this means includes a collar 102 having a spiral groove in its periphery which cooperates with a projection or screw 104 carried by the end member 60. Rotation of the adjusting collar 102 shifts the shaft 89 longitudinally so as to move the carriages 82 and 87 and the electrodes 69 and 70 to bring the arc to a proper position.

A manual means in the form of a control knob 106 is associated with means within the carbon adjusting collar 102 connected with the end of the shaft 89 whereby the shaft may be manually rotated by the knob 106 if it is desired to manually adjust or feed the carbons or electrodes.

A suitable reflector 110 is supported rearwardly of the arc for projecting the light rays or beams from the arc in a forward direction to the lens system hereinafter described. The reflector 110 is mounted upon means (not shown) whereby the reflector may be adjusted or tilted in both horizontal and vertical directions to project the reflected light in the proper direction. A control knob 112 shown in Figure 3 is connected with the reflector and arranged to secure a vertical tilt adjustment of the reflector and the control knob 114 is connected with the reflector in order to secure a horizontal adjustment of the reflector.

Visual means is provided for indicating the relative position of the arc with respect to the reflector 110. Disposed above the arc is a small reflecting means 116 which is shaped to project a small beam of light from the arc onto a screen 118 which is positioned exteriorly of the housing 55 and in convenient view of the operator. A relative shifting of the position of the arc axially of the carbons changes the position of the projected beam upon the screen 118, thus informing the operator that the arc is not in proper position and the same may be restored to its proper position by rotation of the collar 102.

A rheostat 120 which may be manipulated by a control knob 121 is mounted upon the rear closure member 60 and is adapted to regulate the speed of rotation of the motor 94 in order to vary or adjust the combined rate of feed of the electrodes or carbons 69 and 70 by varying the speed of rotation of the carriage driving shaft 89.

The operating drive connection between the carriages 82 and 87 and the shaft 89 is established by the following means: A driving wire 125 is associated with the negative carbon supporting carriage 82 and is fashioned with a portion adapted to engage or mesh with the threads of the threaded portion 92 whereby rotation of the shaft 89 in one direction will advance the carriage 82.

Spaced from the carriage 87 and surrounding the shaft 89 is a collar 127 and disposed between the carriage and the collar is an expansive coil spring 129. A driving wire 131 is associated with the collar 127 for establishing a drive between the threaded region 90 of the shaft and the carriage, the collar being keyed with the carriage 87 whereby the latter is arranged for sliding movement along the shaft 89 relative to the collar 127.

The drive wire 131 has a portion normally disposed between a pair of the threads 90 to establish a drive connection for the carriage 87. The arrangement of drive connection of the collar 127 with the shaft 89 and the provision for slidable movement of the carriage 87 relative to the collar 127 facilitates striking of the arc by bringing the ends of the carbons or electrodes into contact through manual movement of the carriage 87 in a left-hand direction as viewed in Figure 4 against the expansive force of the spring 129.

After current flow between the carbons 69 and 70 is thus established, manual pressure is released from the carriage 87 and the spring 129 automatically moves the carriage 87 a predetermined amount in a right-hand direction as viewed in Figure 4 to establish a proper spacing between the juxtaposed ends of the carbons after the arc is formed.

The arrangement of lens system, the color boomerang or color filter assembly and the controls exercised over the light beam for regulating the shape and size of the projected light pattern or spot and the control or dowsing means for dimming and interrupting the light beam will now be described. As particularly shown in Figures 4 and 5, there is mounted on the portion of the base member or support 40 at the region forwardly of the lamp housing 55 a second longitudinally extending frame base member 130 which is generally of channel shaped cross section as shown in Figure 8 fashioned or shaped with inwardly extending flanges 132.

The frame member 130 is disposed parallel with the frame member 40 and is secured thereto by suitable means. The frame member 130 supports a generally cylindrically-shaped casing or housing 135 enclosing the lens system, the color boomerang assembly and the light beam control devices.

In the arrangement illustrated, the lens system is inclusive of longitudinally spaced lenses 137 and 139 which are relatively adjustable to obtain the proper focus of a light pattern or projected spot. The small lens 137 is supported upon a movable carrier 140 and the large lens 139 is supported upon a movable carrier 142.

Extending longitudinally of the frame member 130 and spaced transversely are rods or ways 144 and 145 shown in Figures 4 and 5. The forward ends of rods 144 and 145 are secured to a transversely extending member 147, the rear ends of the rods extending through openings formed in an upwardly extending member 149, the rods extending through openings in a member 180 providing a support means for the iris control and the masking shutter arrangement for the light beam.

The lens carriage 140 for the small lens 137 is formed with a forwardly extending bracket 152, the carriage 140 and bracket 152 being provided with openings to snugly yet slidably receive the rods 144 and 145 whereby the carriage is slidable along the rods in a manner to maintain the lens 137 in the path of the light projected from the reflector 110.

The lens carrier 142 for the large lens 139 is provided with a bracket 154, the depending portions of which are formed with openings to snugly, yet slidably receive the rods 144 and 145. The lenses 137 and 139 must be adjustable concomitantly in a varying ratio of movement in order to provide the necessary cooperative relation between the lenses to obtain a properly focused light pattern or spot projected by the lens system.

The interconnecting means for the lens carriers in the present arrangement for accomplishing the maintenance of the proper ratio between the lenses is inclusive of a flexible strap or metal band 157 which is secured or anchored at its forward end to a member 159. The anchor member 159 is in the form of a collar which is interiorly threaded to receive a transversely extending threaded rod 160 journaled upon portions of the member 147.

The rod 160 is provided with a knurled manipulating knob 161 for rotating the rod to adjust the position of the anchor member 159 along the rod. The strap 157 takes over a pulley or wheel 163, journaled upon the lens carrier 142, thence over a wheel or pulley 165 which is journally supported upon the member 180 which is fixed upon the rods 144 and 145. The end of the strap 157 adjacent the pulley 165 is secured or anchored to the lens carrier 140.

A bracket 169 securely fastened to the frame or base member 130 forms an anchor for one end of a contractile coil spring 170, the other end of the spring being connected as at 172 with the lens carrier 140 whereby continuous tension is established in the flexible band strip 157 biasing the small lens carrier 140 in a direction toward the carrier 142 supporting the large lens 139. The flexible tape passes around a curved guide member 174 supported upon the base frame member 130. A handle 176 projects transversely from the lens holder 142 providing convenient means for moving the lens carriers.

Thus movement of the front lens carrier by means of the handle 176 automatically effects movement of the rear lens through the medium of the strap or band 157 and the arrangement of guide pulleys, in a direction inverse to the movement of the large lens and to a proportional extent whereby over the entire range of movement from one maximum position of adjustment of the lenses to the other, the lenses and the reflector will be continually maintained in a correct optical relation. This arrangement of lens assembly and adjusting means is of the character disclosed in the patent to Harry A. Strong, No. 2,650,292.

The lamp construction is inclusive of means for varying the size of the light aperture which is referred to herein as the iris control. With particular reference to Figures 4, 5 and 15 through 17, there is illustrated a vertically arranged U-shaped or channel-shaped member 180 supported upon the rods 144 and 145 in the manner shown in Figures 15 through 17.

Each of the rods 144 and 145 is provided with a threaded portion 182 adapted to receive securing nuts 183 for clamping the member 180 to the rods in the manner shown in Figure 17. Each of the rods 144 and 145 is also formed with a tenon portion 185 of reduced diameter which extends through openings formed in flanges 186 of the member 180 and through openings in a bar or reinforcing member 188 welded to the flanges 186 or otherwise secured thereto.

Mounted on the frontal surface of the member 180 is an adapter plate 190 supporting a casing 192 enclosing a plurality of adjustable vanes or blades 194 forming a shutter assembly for controlling the size of the light aperture indicated at 195. The blades or vanes 194 are adjustable to various positions by a control handle 197 provided with a manipulating knob 198.

Thus by moving the control handle 197 to various positions between maximum and minimum limits indicated by broken lines in Figure 15, the size of the substantially circular light aperture 195 may be varied and controlled as desired. The assembly of vanes 194 and casing 192 is of the character conventionally used as a light aperture control for cameras and the like. The casing 192 is secured to the adapter plate by means of screws 196 and the adapter plate 190 is welded or otherwise secured to the member 180.

The arrangement is inclusive of means for varying or modifying the shape of the projected beam, for example, to provide a projected beam or spot of rectangular configuration. This arrangement is shown in Figures 16 through 20. The member 180 is formed with a light passage or aperture 200 preferably of circular configuration as shown in Figure 18.

Disposed at each side of the opening and arranged in vertical position are bars 202 supporting plates 204, the plates 204 extending transversely of the bars 202 in the manner shown in Figure 18. Rivets 205 or other suitable means secure the plates 204 and the spacing bars 202 with the frontal portion of member 180 in the manner shown in Figures 18 through 20.

Slidably disposed within the ways or spaces provided by the bars 202 and the plates 204 are members 207 and 208. The member 207 is configurated with a transversely extending portion 209 to which is secured a vane, plate or light interrupting member 210 of generally rectangular configuration, the plate being secured to the portion 209 by means of a bolt 211. The member 208 is likewise provided with a projection 212 to which is secured a rectangular plate or member 214 substantially identical with plate 210, the plate 214 being secured to projection 212 by means of a bolt 215.

Means is provided for moving or translating the plates 210 and 214 in vertical directions toward and away from each other for the purpose of defining or shaping the light beam to a rectangular or strip-like spot or pattern. Each of the members 207 and 208 is formed at its lower end with a projecting ear 217. Pivotally supported upon a member 219 carried by the member 180 is an L-shaped bracket or plate actuating member 221 which is equipped with a rod 222 equipped with a manipulating knob 224.

Rods 227 and 228 are each provided with bent portions 229 which extend into openings formed at each side of the fulcrum or pivotal axis of the bracket member 221 as shown in Figures 18 and 19. The rods 227 and 228 are connected to the ears 217 of the slidably arranged members 207 and 208.

It will be apparent that when the masking shutter or plate arrangement is in a position with the control handle 222 in the dotted position extending in a right-hand direction as viewed in Figure 18, the shutters, plates or blades 210 and 214 are spaced a maximum distance apart so that they do not influence the shape of the projected light beam or pattern.

As the handle 222 is swung from such position in a left-hand direction as viewed in Figure 18, the rods 227 and 228 move the members 207 and 208 in directions moving the masking shutters or blades 210 and 214 toward one another, an intermediate position of the blades or shutters being shown in Figure 18. The aperture configuration provided by the shutters produces a projected light spot or pattern of horizontally elongated rectangular shape. When the member 222 is moved to the extreme left-hand position as viewed in Figures 18 and 20, the masking shutters or blades 210 and 214 are substantially closed. A plate spring 223 bearing against the member 221 serves to frictionally retain the shutters in adjusted positions.

The actuating member 221 is formed with angularly disposed surfaces 230, shown in Figures 18 and 20, which are adapted for selective contact with the upper edges of plates 204 for defining or limiting the two extreme positions of adjustment of the masking shutters. It will be apparent that, depending upon the relative position to which the bracket or actuator 221 is adjusted by the operator, the projected light pattern or spot may be attained of rectangular configuration of a narrow or wide band of light as may be desired. The arrangement also includes means for variably dimming or completely dowsing or interrupting the light projected from the reflector. The light dimming control arrangement is more especially shown in Figures 4 and 12 through 14. Secured to the member 180 is a vertically disposed channel-shaped member 235 which is secured to member 180 by means of rivets 236.

The opposed walls 238 of the member 235 are provided with pairs of aligned openings into which extend respectively shafts 240 and 242, the shafts being rotatably supported in the walls 238 and maintained against endwise movement by a plate 239. The upper shaft 240 supports a light dimming dowser plate or shutter 244 and the shaft 242 supports a lower light dimming dowser plate or shutter 246. A masking plate 248 is secured to the upper shutter 244 and serves, when the plates 244 and 246 are in full light interrupting or light dowsing position, to prevent the projection of light through the slit formed at the meeting edges of the shutters or plates.

The lower shutter or plate 246 is provided with means for permitting the projection of a small pin point of light when the shutters are in closed or light interrupting position. The pin point of light may be used for sighting for determining the region at which the light will be projected when the shutters 244 and 246 are opened. Secured to the shutter or vane 246 is a tubular member 250 which, as shown in Figure 12 is provided at its distal end with a small aperture 251 which, with a small aperture 252 in the plate 246, permits the passage of an extremely small beam of light.

The arrangement is inclusive of means for adjusting or regulating the positions of the light dimming shutters 242 and 246 from full open to closed position. Secured to the upper portion of member 235 by means of rivets 255 is a bracket 257 provided with a member 260 upon which a bracket or actuator 265 is pivotally supported or fulcrumed for movement about the axis of the support 260. The member 265 is provided with control rod 267 and a manipulating knob 268 for shifting the position of the bracket 265.

Secured to the vanes or blades 244 and 246 respectively are L-shaped members 270 and 272. A rod 274 connects the bracket 270 with the actuator 265, and a rod 276 connects the bracket 272 with the actuator at the opposite side of its fulcrum 260. A spring plate or washer 269 secured to the support 260 by a nut 271 frictionally engages a surface of the actuator 265 to hold the latter in any position of adjustment.

From the foregoing it will be apparent that when the control rod 267 is in the full line position as shown in Figure 12, the light interrupting blades or vanes 244 and 246 are in closed position so as to completely block or interrupt the light rays projected from the reflector 110, the only light projecting forwardly of the shutters being a small pencil of light projected through apertures 251 and 252.

When the control handle 267 is moved to the position indicated by broken lines in Figure 12, the shutters or vanes 244 and 246 are at full open or light transmitting position. By manipulation of the handle 267 to positions intermediate those illustrated in Figures 12 and 13, any degree of dimming of the light may be obtained. A closure plate 279, slotted to accommodate the control rods 197, 222 and 267, is secured to the upper portion of the housing 135 as shown in Figure 4.

The projection lamp arrangement of the invention is inclusive of a color boomerang or light filter arrangement particularly shown in Figures 4 and 6 through 11 inclusive, for imparting various colors to the projected light. With particular reference to Figures 4, 6, 8, 9 and 10, there is illustrated a color filter enclosure or casing 280 preferably formed of sheet metal mounted upon the housing 135. Secured to the lens housing 135 is a slotted cover member 282 which forms a support for the components of the color boomerang arrangement.

The cover member 282 may be secured to the housing 135 by means of screws 284. An opening is formed in the wall of the lens housing 135 which is embraced by the housing 280 and the cover member 282 to accommodate the color filter units as shown in Figure 8. The lower edge of the casing 280 is interengaged in overlapping relation with an edge region of a portion of the wall of housing 135 as indicated at 286.

The cover member 282 is formed with a flange 289 formed with threaded openings to receive knurled securing screws 290, the screws having tenon portions which enter into openings formed in the sheet metal casing 280 to secure the latter in closed position. Ready access to the chamber 287 provided by casing 280 enclosing the color filters may be had by removing the threaded members 290 and elevating the casing 280 to disengage the interlocking connection 286 when it is desired to replace color filters in a manner hereinafter explained. The casing 280 may, if desired, be hinged to the housing 135 at the region identified at 286.

An important feature of the invention resides in the positioning of the color boomerang assembly or color filter arrangement within an enclosure associated with the lens housing 135 and between the lenses 137 and 139 as shown in Figure 4.

Heretofore it has been the practice to mount the color filters on a separate support forwardly of the lamp structure and lens housing. With the present arrangement the color filters are completely enclosed, free from liability of damage and accumulation of dust which would impair the light transmitting characteristics of the filters. Furthermore the present arrangement places the color filter controls within easy reach of the operator.

Each of the color filters of the color boomerang is individually mounted and is selectively movable from an out-of-use or stored position to a position in the path of the projected light to impart color to the light. Secured to each of the end walls of the cover member 282 is an upwardly extending bracket 292 which journally supports a shaft 294 retained against endwise movement by cotter keys 295, the shaft providing a pivotal support for each of the color filter assemblies.

In the embodiment illustrated, the color boomerang arrangement is inclusive of six color filters each of which is supported upon a lever member or holder, the latter being pivotally supported for movement about the axis of the shaft 294. As the color filter supporting units are identical, a description of one of the units or assemblies will suffice. In addition to the color filters in the assembly, the arrangement includes an ultra-violet filter which is supported and operated in the same manner as the color filters.

The six levers or holders, each carrying a color filter, are numbered 300 through 305 as shown in Figures 6 and 7, the lever supporting the ultraviolet filter being designated 306. With particular reference to Figure 9, the lever 305 carrying a color filter 308 and the lever 306 supporting an ultra-violet filter 310 are shown with the color filter and ultra-violet filter in the path of the light projected from the reflector 110.

The assembly of lever arrangement 305 and the filter 308 carried thereby will be described. The lever 305 is formed intermediate its ends with an opening to receive a tenon portion formed on a bearing member or sleeve 320 as shown in Figure 10. The bearing member 320 is rotatably supported upon the shaft 294 and forms a fulcrum or pivotal support for the lever. The lever 305 is formed with a grip portion 321 for ease in manipulation.

A coil spring 323 surrounds the bearing sleeve 320, one end of the spring engaging the lever as shown in Figure 8, the other end 325 of the spring engaging a portion of the cover member 282, the spring normally urging or biasing the lever in a direction to normally retain the filter in an out-of-use or stored position within the casing 280 out of the path of the light beam.

As shown in Figures 9 and 11, the distal end of the lever 305 is provided with a pair of plates 326 and 327, the plate 327 being of larger dimension than the plate 326. The color filter 308, which may be of gelatin material, is mounted within a circular annular frame 329 formed of sheet metal or the like to which is secured a channel-shaped securing bracket or member 332.

Secured to the lever 305 is a member 334 formed with a notch 335 shown in Figures 8 and 11 adapted to receive a means for retaining the lever 305 in a position with the color filter 308 in the path of the light beam. With particular reference to Figures 7 and 8, it will be seen that the cover member 282 is formed with depending ears 336, 337 and 338 formed with aligned openings to receive a shaft 340.

Disposed between the ears 336 and 337 is a longitudinally extending member or bar 342 formed with a bent portion 344 along one edge as shown in Figures 7 and 8, the bent portion 344 being adapted to extend into the notch 335 in the member 334 when the lever 305 is in the position shown in Figure 8 with the color filter 308 in operative or light filtering position in the light beam. A coil spring 346 of the expansive type is disposed between the cover member 282 and an ear portion 343 formed on the bar 342 for normally urging the bar into a position to bring the bent edge portion 344 into the notch 335 in member 334.

A portion of the bar 342 extends in the path of a pin 348 slidably mounted in an opening formed in a boss portion of the cover member 282 as shown in Figures 6 and 8. When it is desired to release the lever 305 so that the spring 323 is effective to move the lever to a position bringing the color filter out of the light beam and into the casing 280, the pin 348 is depressed, elevating the bent portion or pawl 344 out of the notch 335 releasing the lever 305.

Each of the levers carrying the other filters is also provided with an individual bracket or member 335 which is notched for cooperation with the bent portion 344 of the bar 342. Thus any one or all of the levers with color filters in operative position will be released upon depression of the button 348 as the bent portion 344 extends adjacent all of the latch members 334 as shown in Figure 7.

With particular reference to Figure 11, it will be seen that the channel-shaped member 332 carried by the color filter supporting frame 329 is adapted to be slipped over the plate 327 carried by the lever or holder 305 so that the channel member 332 and the plates 326 and 327 are in telescoped relation as shown in Figures 8 and 9 whereby the color filters are readily removable from the supporting levers.

Arranged at the upper portion of the channel member 332, as viewed in Figure 11, is a block or abutment 333 which engages the upper edge of the plate 327 to limit the slidable movement of channel 332 with respect to the plate 327 and determine the position of the color filter frame with respect to the lever 305. When it is desired to change a color filter or make a replacement, the knurled screws 290 may be withdrawn and the casing 280 removed providing access to the color filter assemblies.

To remove a filter from its supporting lever, the operator merely slides the filter frame upwardly, disengaging the channel member 332 from the plates 326 and 327 and affix a new or different filter frame in the same position on the lever 305. While only one of the lever and color filter assemblies has been described in detail, it is to be understood that the color filter and holder assemblies are identical with that herein described with the exception that the individual levers 300 through 305 are of different lengths as illustrated in Figure 6 for ease in selecting a color filter for movement into operative position in the path of the light beam.

Another feature of the color boomerang assembly is that movement of a filter assembly into operative position automatically releases any other filter assembly or assemblies in operative position for return to an out-of-use position. Thus, when one color filter unit such as the color filter 308 is in operative position in the path of the light beam, movement of any other color filter unit into operative position brings the bracket 334 of the succeeding filter assembly into engagement with the portion 344 of the pawl or bar 342 causing the pawl to be rocked in a counterclockwise direction as viewed in Figure 8 so as to disengage the portion 344 from notch 335 with the bracket 334 of whatever color filter assembly is in operative position.

When this disengagement takes place, the adjacent spring 323 moves the first assembly into an out-of-use position and the portion 344 of the pawl engages in the notch in the bracket 335 of the succeeding color filter assembly to retain the latter in operative position. In this manner, the operator is enabled to rapidly effect successive color filter changes without depressing the button 348.

It will be apparent that depression of the button 348 will release all of the color filters from an operative or light intercepting position and the filters moved under the biasing action of springs 323 to out-of-use positions. The arrangement of the invention includes an independent assembly supporting an ultra-violet filter 310. Secured to the operating lever 306 for the ultra-violet filter is a bracket 355 which, with the lever 306 are secured to a bearing member 357 mounted on the shaft.

The bracket 355 assists in supporting the ultra-violet screen or filter which is of increased weight as compared with the relatively thin gelatin color filters hereinbefore described. In order to secure sufficient biasing force to return the ultra-violet filter assembly to a stored or out-of-use position, two springs 359 are employed as shown in Figure 9. The ultra-violet filter assembly is associated with a retaining means independent of the retaining means 342 for the color filter assemblies. As shown in Figure 7, a member 360 is journalled upon the shaft 340, the member 360 being of substantially the same cross section as the member 342. The member 360 is biased toward filter locking or retaining position by a spring 363 which is similar to spring 346.

The member 360 is also formed with a hook or bent portion 365 of the same configuration as the portion 344 and is adapted to engage a bracket of the same character as bracket 334 to hold the ultra-violet filter assembly 310 in operative position in the path of the light beam. As shown in Figure 6, an independently operated release button 365 is provided which, when depressed, moves the locking member or pawl 360 out of engagement with a notch in the bracket carried by the ultra-violet lens assembly, the latter being automatically returned to an out-of-use position by the springs 359. The ultra-violet filter 310 may be utilized independently of or in conjunction with the other filter units.

The lamp arrangement of the invention includes an alternating current rectifier for providing direct current power supply to the carbons for forming the arc. In the embodimnet illustrated, the rectifier unit is supported by the forward region of the frame member or base pan 40 as shown in Figure 4. The rectifier construction is preferably of the selenium type and is inclusive of a substantially rectangular casing or housing 370 which is secured to the base pan 40 by means of brackets 371 shown in Figure 2.

The plates of the rectifier unit 373 are supported within the casing 370 by a transversely extending shaft or bolt 375, and the lead wires or current conductors from the rectifier unit passing through suitable grommets 377 carried by the housing wall, one of the grommets being shown in Figure 4. A feature of the rectifier arrangement is the provision of ventilating means for establishing a continuous flow of air around the plates of the rectifying unit during the operation of the lamp and to cool the color filters in the enclosure containing the filters. It is essential to cool the filters as they are formed of thin gelatin material and, in use, are disposed in the light beam and subjected to substantial heat from the arc.

The front end of the housing 370 is equipped with an open mesh wire screen 380 through which air may enter into the rectifier housing or casing 370. The rear wall 382 of the housing 370 supports an air circulating means or blower 384 which may be of the rotating drum or sirocco type enclosed within a blower casing 385. The wall 382 of the rectifier casing is formed with an opening 387 and air enters the blower casing 385 through the opening 387.

The blower is operated by an electric motor 389 shown in Figure 4. The outlet 391 of the blower extends upwardly through the base pan 40, and positioned within the base pan is an angularly disposed air deflector 393 disposed so as to direct air from the blower into a region occupied by the color filters of the boomerang construction when the filters are in operative position in the path of the light beam.

Operation of the blower 384 draws air into the rectifier casing through the mesh screen 380, thence into the blower through the opening 387, the air being discharged from the blower through the channel 391 and deflected toward the color filter assemblies by the deflecting means 393. In this manner the temperature of the rectifier is reduced and controlled and air circulation maintained continuously in the region occupied by the color filters so as to reduce the temperature in the latter region.

As the various electrical circuits associated with the lamp arrangement form no part of the present invention, it is not deemed necessary to describe them in detail. However alternating current of conventional voltage from a supply is conveyed to a transformer contained within the pedestal housing 20, the rotary switch control 22 serving to adjust the proper voltage delivered to the rectifier which supplies direct current to the carbons or electrodes to form the arc. The alternating current supply at standard supply line voltage is utilized for operating the electrode feed motor 94 and the rectifier ventilating blower motor 389.

In the operation of the lamp, the arc is first "stuck"

or formed by engaging the carbons 69 and 70 to complete the circuit. This is accomplished by manually moving the positive carbon supporting carriage 87 toward the collar 127 shown in Figure 4, which action brings the tips of the carbons into contact. As soon as the arc is formed, manual pressure on the carriage 87 is withdrawn and the spring 129 moves the carriage 87 forwardly or in a right-hand direction as viewed in Figure 4 to a predetermined spacing of the carbons producing a satisfactory arc.

The electrode feed motor 94 is energized, rotating the shaft 89 to move the electrode carriages 82 and 87 at the proper speeds to compensate for the burning away of the carbons or electrodes 69 and 70. The arc may be adjusted to proper focus or position with respect to the reflector by manipulation of the collar 102. The light rays from the arc are projected by the reflector 110 through the small lens 137 thence through the large lens 139 and the light is projected forwardly thereof as a substantially cylindrical beam.

The color of the light beam may be changed by manipulation of the light filters of the color boomerang assembly which is disposed so as to position the light filters between the lenses 137 and 139 in the locus of the projected light rays. The iris control 198 may be adjusted to secure the proper size of circular aperture desired. The control 224 may be manipulated for masking the beam to provide a rectangularly shaped projected spot for the beam, and the control 268 manipulated to variably dim the light or to completely interrupt or dowse the light beam. The color filters of the color boomerang arrangement are operated in the manner hereinbefore described. The lenses 137 and 139 are adjusted to secure the proper focus by manipulating the handle 176 on the large lens carrier 142.

It is apparent that, within the scope of the invention, modifications and different arrangements may be made other than is herein disclosed, and the present disclosure is illustrative merely, the invention comprehending all variations thereof.

I claim:

1. An apparatus for producing a controlled beam of light including in combination, an enclosure, a light source mounted in said enclosure, a reflector mounted in said enclosure on the rearward side of said light source and arranged to reflect light from said light source, a lens system in said enclosure on the forward side of said light source through which the reflected light is directed, said lens system including an adjustable lens for securing proper focus of the light beam formed by the lens system, aperture varying means positioned within said enclosure on the forward side of said light source and rearwardly of said lens system, control means for adjusting said aperture varying means, light filtering means in said enclosure disposed in a region between said aperture forming means and said lens system and movable to position in and out of the path of said reflected light, a casing carried by said enclosure on the forward end thereof, a rectifier in said casing for supplying direct current for energizing said light source, a blower means connected to said enclosure adjacent said casing and said blower connected to said casing at the suction end thereof, said blower means directing an air stream in the region of said light filtering means, said enclosure pivotally connected to a supporting base member, said enclosure being substantially weight balanced on said supporting base member, said light filtering means including, a plurality of light filters, each of said filters mounted in a filter supporting frame, a channel-shaped bracket connected to said frame, a filter positioning lever support mounted in said enclosure, a plate member connected to said lever support, said bracket and said plate member interengaging to removably connect said frame with said lever support, and means on said bracket limiting the sliding motion of said plate and bracket.

2. An apparatus for producing a controlled beam of light as defined in claim 1 wherein, said enclosure has integrally connected to the top side thereof a filter housing, said filter housing having a filter cover for permitting accessible entry into said enclosure, said lever support mounted within said housing for movement of said filters in and out of operative filtering position, said housing being the normal container for inoperative filters and said enclosure being the container for operative filters, said filter positioning lever lowering said filters from said housing into operative position within said enclosure, and an automatic means for returning said filters to inoperative position within said housing.

References Cited in the file of this patent

UNITED STATES PATENTS

| | | |
|---|---|---|
| 1,654,873 | Greenewalt | Jan. 3, 1928 |
| 1,711,983 | Bassett | May 7, 1929 |
| 1,742,600 | Kliegl et al. | Jan. 7, 1930 |
| 1,831,762 | Blohm | Nov. 10, 1931 |
| 1,876,511 | Oberg et al. | Sept. 6, 1932 |
| 2,009,145 | Nathan | July 23, 1935 |
| 2,059,361 | Kenworthy | Nov. 3, 1936 |
| 2,076,240 | Levy | Apr. 6, 1937 |
| 2,137,103 | Yost et al. | Nov. 15, 1938 |
| 2,273,316 | Goerg et al. | Feb. 17, 1942 |
| 2,650,292 | Strong | Aug. 25, 1953 |